(12) United States Patent
Kim et al.

(10) Patent No.: US 7,742,598 B2
(45) Date of Patent: Jun. 22, 2010

(54) SHRINKING KEY GENERATOR FOR PARALLEL PROCESS

(75) Inventors: Dong Soo Kim, Taejon (KR); Young Soo Kim, Taejon (KR); Dae Seon Park, Taejon (KR); Jang Hong Yoon, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1109 days.

(21) Appl. No.: 11/155,744

(22) Filed: Jun. 20, 2005

(65) Prior Publication Data

US 2006/0133608 A1  Jun. 22, 2006

(30) Foreign Application Priority Data

Dec. 17, 2004  (KR) ............... 10-2004-0108120

(51) Int. Cl.
*H04L 9/00* (2006.01)
(52) U.S. Cl. .......................... 380/44; 380/43
(58) Field of Classification Search ............ 380/44
See application file for complete search history.

(56) References Cited

U.S. PATENT DOCUMENTS

| | | | | | |
|---|---|---|---|---|---|
| 4,310,227 | A | * | 1/1982 | Zinchuk | 396/106 |
| 4,426,667 | A | * | 1/1984 | Masher et al. | 360/44 |
| 5,043,988 | A | * | 8/1991 | Brglez et al. | 714/739 |
| 5,144,571 | A | * | 9/1992 | Thong | 708/276 |
| 5,568,330 | A | * | 10/1996 | Sawaguchi et al. | 360/46 |
| 5,872,793 | A | * | 2/1999 | Attaway et al. | 714/726 |
| 6,052,770 | A | * | 4/2000 | Fant | 712/14 |
| 6,069,574 | A | * | 5/2000 | Eo et al. | 341/50 |
| 6,701,476 | B2 | * | 3/2004 | Pouya et al. | 714/727 |
| 6,771,725 | B2 | * | 8/2004 | Agazzi et al. | 375/355 |
| 6,836,869 | B1 | * | 12/2004 | Wyland | 714/781 |
| 7,480,687 | B2 | * | 1/2009 | Dirscherl et al. | 708/252 |
| 2001/0003530 | A1 | * | 6/2001 | Sriram et al. | 375/130 |
| 2002/0061078 | A1 | * | 5/2002 | Cameron | 375/341 |
| 2002/0178431 | A1 | * | 11/2002 | Chapman et al. | 716/16 |
| 2003/0081775 | A1 | * | 5/2003 | Campagna et al. | 380/46 |
| 2003/0105791 | A1 | * | 6/2003 | Stein et al. | 708/492 |

(Continued)

FOREIGN PATENT DOCUMENTS

KR  1020030043447  6/2003

OTHER PUBLICATIONS

D. Coppersmith et al., "The Shrinking Generator," Springer-Verlag, 1998, pp. 22-39.*

(Continued)

*Primary Examiner*—Michael Pyzocha
*Assistant Examiner*—Luu Pham
(74) *Attorney, Agent, or Firm*—Lowe Hauptman Ham & Berner LLP

(57) ABSTRACT

A parallel processing shrinking key generator is provided. The parallel processing shrinking key generator includes: a selection linear feedback shift register (LFSR); a source LFSR; a selection logic circuit for selecting one of a source bit of the source LFSR and a predetermined input bit according to a selection bit of the selection LFSR; an index counter for assigning an index where output bits of the selection logic circuit are stored at a next clocking of a clock signal; and an output amount register for shifting an output bit of the selection logic circuit according to the assignment of the index counter.

16 Claims, 9 Drawing Sheets

U.S. PATENT DOCUMENTS

2003/0152221 A1* 8/2003 Cheng et al. .................. 380/46
2004/0015527 A1* 1/2004 Sriram et al. ............... 708/250
2004/0071289 A1* 4/2004 Rose et al. .................... 380/37
2005/0053233 A1* 3/2005 Vaudenay et al. ............. 380/44
2005/0203979 A1* 9/2005 Clements et al. ............ 708/251

OTHER PUBLICATIONS

A. Menezes et al., "Handbook of Applied Cryptography," CRC Press, 1996, Chapter 6.*
Don Coppersmith, et al.; "The Shrinking Generator"; Springer-Verlag; 1998; pp. 22-39.

* cited by examiner

| s[3] | s[2] | s[1] | s[0] | z[3] | z[2] | z[1] | z[0] |
|---|---|---|---|---|---|---|---|
| 0 | 0 | 0 | 0 | z'[3] | z'[3] | z'[1] | z'[0] |
| 0 | 0 | 0 | 1 | a[0] | z'[3] | z'[2] | z'[1] |
| 0 | 0 | 1 | 0 | a[1] | z'[3] | z'[2] | z'[1] |
| 0 | 0 | 1 | 1 | a[1] | a[0] | z'[3] | z'[2] |
| 0 | 1 | 0 | 1 | a[2] | z'[3] | z'[2] | z'[1] |
| 0 | 1 | 0 | 1 | a[2] | a[0] | z'[3] | z'[2] |
| 0 | 1 | 1 | 0 | a[2] | a[1] | z'[3] | z'[2] |
| 0 | 1 | 1 | 1 | a[2] | a[1] | a[0] | z'[3] |
| 1 | 0 | 0 | 0 | a[3] | z'[3] | z'[2] | z'[1] |
| 1 | 0 | 0 | 1 | a[3] | a[0] | z'[3] | z'[2] |
| 1 | 0 | 1 | 0 | a[3] | a[1] | z'[3] | z'[2] |
| 1 | 0 | 1 | 1 | a[3] | a[1] | a[0] | z'[3] |
| 1 | 1 | 0 | 0 | a[3] | a[2] | z'[3] | z'[2] |
| 1 | 1 | 0 | 1 | a[3] | a[2] | a[0] | z'[3] |
| 0 | 1 | 1 | 1 | a[3] | a[2] | a[1] | z'[3] |
| 1 | 1 | 1 | 1 | a[3] | a[2] | a[1] | a[0] |

FIG.9

| s[3] | s[2] | s[1] | s[0] | z[3] | z[2] | z[1] | z[0] |
|---|---|---|---|---|---|---|---|
| 0 | 0 | 0 | 0 | 0 | 0 | 0 | 0 |
| 0 | 0 | 0 | 1 | z'[0] | 0 | 0 | 0 |
| 0 | 0 | 1 | 0 | z'[0] | 0 | 0 | 0 |
| 0 | 0 | 1 | 1 | z'[1] | z'[0] | 0 | 0 |
| 0 | 1 | 0 | 0 | z'[0] | 0 | 0 | 0 |
| 0 | 1 | 0 | 1 | z'[1] | z'[0] | 0 | 0 |
| 0 | 1 | 1 | 0 | z'[1] | z'[0] | 0 | 0 |
| 0 | 1 | 1 | 1 | z'[2] | z'[1] | z'[0] | 0 |
| 1 | 0 | 0 | 0 | z'[0] | 0 | 0 | 0 |
| 1 | 0 | 0 | 1 | z'[1] | z'[0] | 0 | 0 |
| 1 | 0 | 1 | 0 | z'[1] | z'[0] | 0 | 0 |
| 1 | 0 | 1 | 1 | z'[2] | z'[1] | z'[0] | 0 |
| 1 | 1 | 0 | 0 | z'[1] | z'[0] | 0 | 0 |
| 1 | 1 | 0 | 1 | z'[2] | z'[1] | z'[0] | 0 |
| 1 | 1 | 1 | 0 | z'[2] | z'[1] | z'[0] | 0 |
| 1 | 1 | 1 | 1 | z'[3] | z'[2] | z'[1] | z'[0] |

SHRINKING KEY GENERATOR FOR PARALLEL PROCESS

BACKGROUND OF THE INVENTION

1. Field of the Invention

The present invention relates to a parallel processing shrinking key generator, and more particularly, to a shrinking key generator for providing a high speed key generation by configuring a parallel processing logic with a 2:1 multiplexer.

2. Description of the Related Art

FIG. 1 is a block diagram illustrating a conventional shrinking key generator.

As show in FIG. 1, the conventional shrinking key generator includes a selection linear feedback shift register (LFSR) 1 for shifting a selection bit according to an inputted clock signal (Clock); a source LFSR 2 for shifting a source bit according to the clock signal (Clock); a sequential processing logic 3 having a multiplexer 31 for sequentially processing the selection bit of the selection LFSR 1 and the source bit of the source LFSR 2, and logic elements 32, 33; and an output amount register 4 for storing output bits of the sequential processing logic 3.

Hereinafter, operations of the conventional shrinking key generator of FIG. 1 will be explained in detail.

The conventional sequential processing logic 3 is easy to be implemented as hardware but a speed of generating key in the conventional sequential processing logic 3 is unusually slow. However, a parallel processing logic according to the present invention may be difficult to be embodied as hardware but quickly generates a key. A parallel processing logic is embodied as hardware by combining logical elements, such as AND gate or OR gate, based on a Boolean Algebraic characteristic of a parallel processing algorithm. That is, a combinational logic is used for embodying the parallel processing logic. In case of a shrinking key generator, a non-boolean algebraic key generation algorithm is used. Since the non-boolean algebraic key generation algorithm does not have the boolean algebraic characteristic, it is impossible to use a parallel processing logic for embodying the shrinking key generator as hardware up to now.

The shrinking key generator has been spotlighted as the most reliable algorithm for encoding/decoding data in a view of a security because there are no specific attacking methods reported or introduced. The shrinking key generator is generally selected when a high-speed key generation is not required. Although the shrinking key generator provides excellent reliability, the shrinking key generator is not selected for a system requiring an Mbps-level data processing speed because of slow speed of key generation. According to development of a wireless data link having wide-bandwidth and a fast Codec processing technology, a high-speed processing technology is also required for encoding and decoding data.

Conventionally, behavioral hardware description language (HDL) codes were not synthesized. According to development of a synthesis tool, many of Behavioral HDL codes, such as a conditional statement and a repetition statement, can be synthesized without problems. However, there are many difficulties still remained to synthesize Behavioral HDL codes, i.e., operation statements related to a pointer index, because of instabilities in an ineffective use of a Cell and a timing simulation. In order to express a selection logic of a shrinking key generator, operations related to the pointer index and operations related to a dynamic memory assignment must be expressed as the Behavioral HDL codes by using the synthesis tool. Therefore, it is impossible to express the selection logic of the shrinking key generator having the non-boolean algebraic characteristic as HDL codes and to synthesize the HDL codes by using the synthesis tool.

SUMMARY OF THE INVENTION

Accordingly, the present invention is directed to a [title], which substantially obviates one or more problems due to limitations and disadvantages of the related art.

It is an object of the present invention to provide a parallel-processing shrinking key generator for increasing a speed of key generation by configuring a parallel processing logic with a 2:1 multiplexer without using logical elements such as an AND gate or an OR gate.

It is another object of the present invention to provide a parallel-processing shrinking key generator designed with a combinational logic by selecting a structural hardware description language (HDL) approach.

It is a further another object of the present invention to provide a parallel-processing shrinking key generator including a combinational logic using a 2:1 multiplexer for including number of all cases and an index counter variably indexing a dynamic memory generated from a non-boolean algebraic.

It is a still another object to the present invention to provide a parallel-processing shrinking key generator designed as a parallel processing logic based on 16 Bus bit and including a pipeline stage register between stages for solving a fan in & fan out problem.

It is a further still another object of the present invention to provide a parallel-processing shrinking key generator including a combinational logic having: a counter logic varied according to the number of output bits of a selection logic; and a pushing logic and a through logic for expressing number of all cases by using a 2:1 multiplexer.

It is a further still another object of the present invention to provide a parallel-processing shrinking key generator for increasing a speed of generating a key by designing a selection logic as a combinational logic capable of a parallel processing. For example, a speed of key generation in a conventional shrinking key generator is average 1 bit per 2 clocks. In the present invention, a speed of key generation is the number of bus bit per 2 clocks. If the number of bus bit is 16, the speed is 16 bits per 2 clocks.

It is a further still another object of the present invention to provide a parallel-processing shrinking key generator for eliminating instabilities such as a fan-in & fan-out and a clock skew in order to reduce ineffective use of logic cell when a selection logic is synthesized to a Behavioral HDL code, and accurately estimate a result in a timing simulation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a parallel processing shrinking key generator having a selection linear feedback shift register (LFSR), a source LFSR and an output amount register, the parallel processing shrinking key generator including: a selection logic circuit for selecting one of a source bit of the source LFSR and a predetermined input bit according to a selection bit of the selection LFSR; an index counter for assigning an index where output bits of the selection logic circuit are stored at a next clocking of a clock signal; and an output amount register for shifting an output bit of the selection logic circuit according to the assignment of the index counter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 9 is a truth table of a through logic shown in FIG. 7;

DETAILED DESCRIPTION OF THE INVENTION

Reference will now be made in detail to the preferred embodiments of the present invention, examples of which are illustrated in the accompanying drawings.

Figure 2:
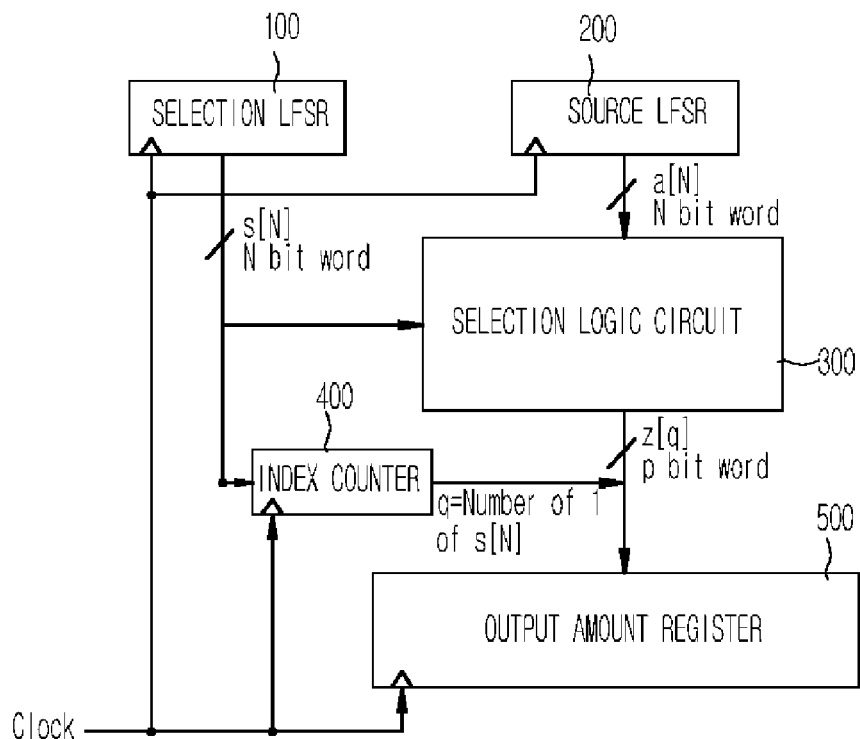
FIG. 2 is a parallel processing shrinking key generator according to a preferred embodiment of the present invention.

FIG. 2 is a parallel processing shrinking key generator according to a preferred embodiment of the present invention.

As shown in FIG. 2, the parallel processing shrinking key generator according to the present embodiment includes a selection LFSR 100 for shifting a selection bit according to an inputted clock signal (Clock); a source LFSR 200 for shifting a source bit according to the clock(Clock); a selection logic circuit 300 for selecting one of the source bit of the source LFSR 200 and a predetermined inputted bit according to the selection bit of the selection LFSR 100; an index counter 400 for assigning an index where output bits of the selection logic circuit 300 are stored at a next clock of the clock signal; and an output amount register 500 for shifting an output bit of the selection logic circuit 300 according to the assignment of the index counter 400.

Figure 3:
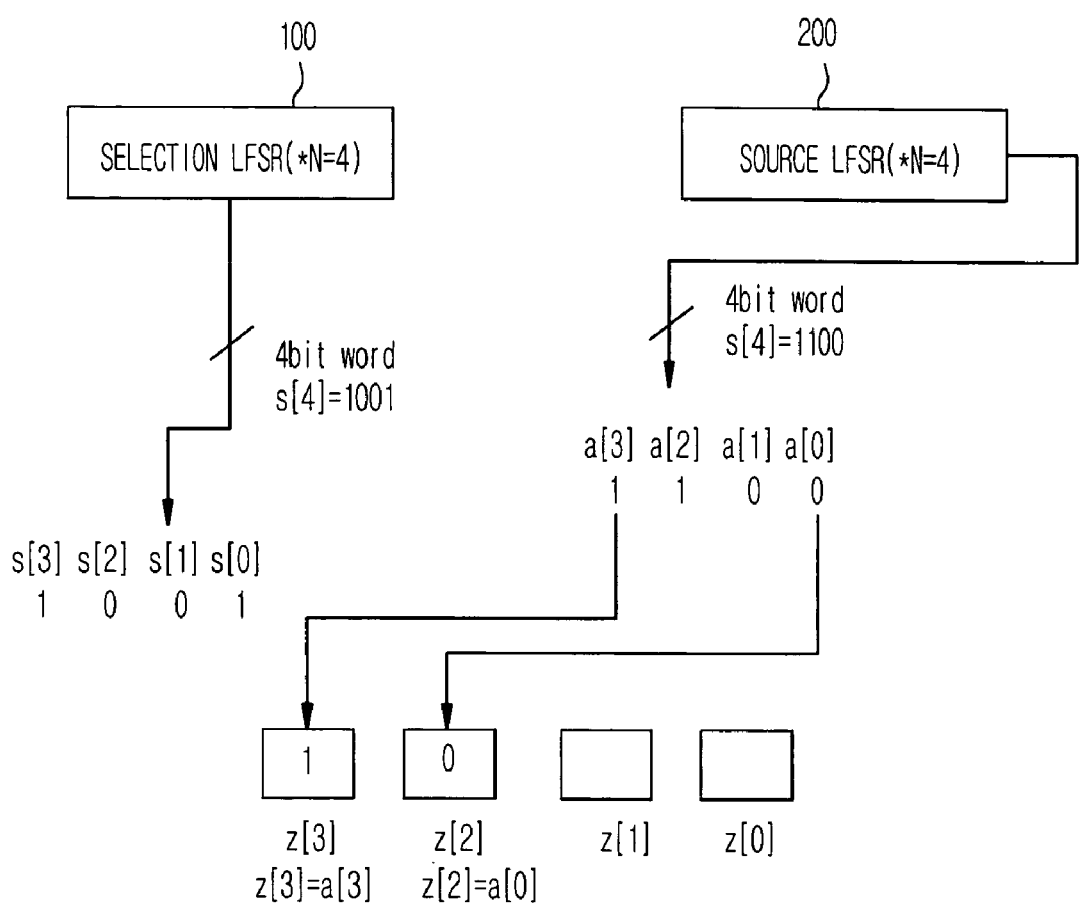
FIG. 3 is a view for explaining an operation principle of a pushing logic of a selection logic circuit shown in FIG. 2.
Figure 4:
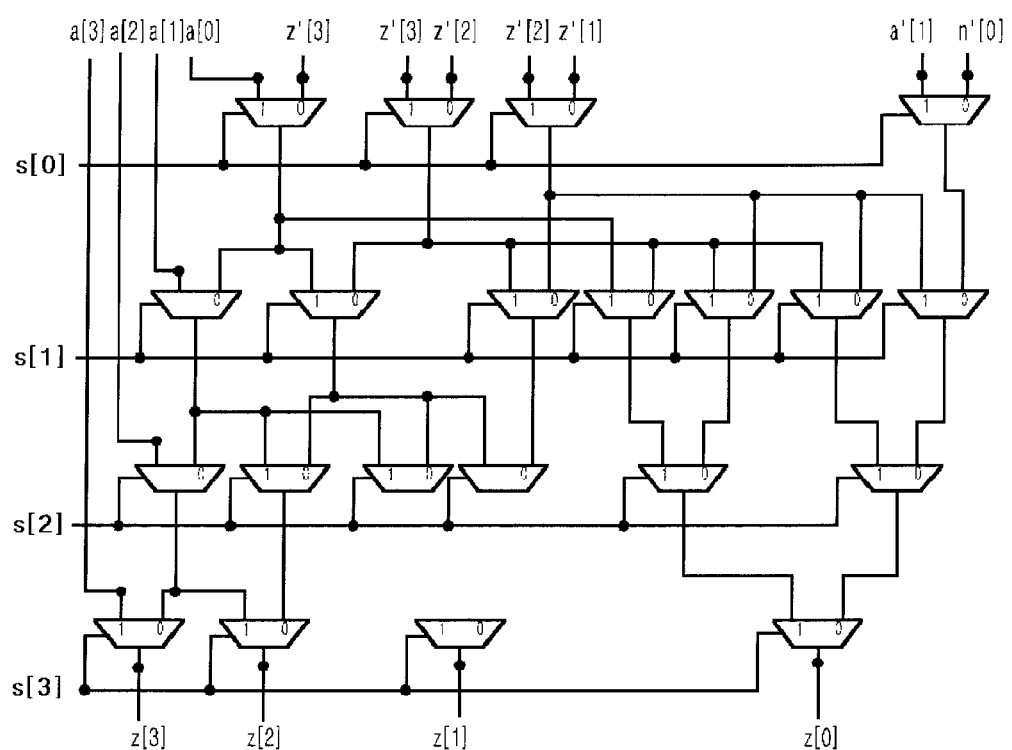
FIG. 4 is a detailed circuit diagram of a pushing logic shown in FIG. 3.

FIG. 3 is a view for explaining an operation principle of a pushing logic of a selection logic circuit shown in FIG. 2 and FIG. 4 is a detailed circuit diagram of a pushing logic shown in FIG. 3.

As shown in FIG. 3, the selection logic circuit 300 configures singe pushing logic at a first stage if each of the selection bit from the selection LFSR and the source bit from the source LFSR is 4 bit.

As shown in FIG. 4, the pushing logic is configured with a plurality of 2:1 multiplexer for multiplexing the source bit of the source LFSR and a predetermined inputted bit.

Figures 5, 6:
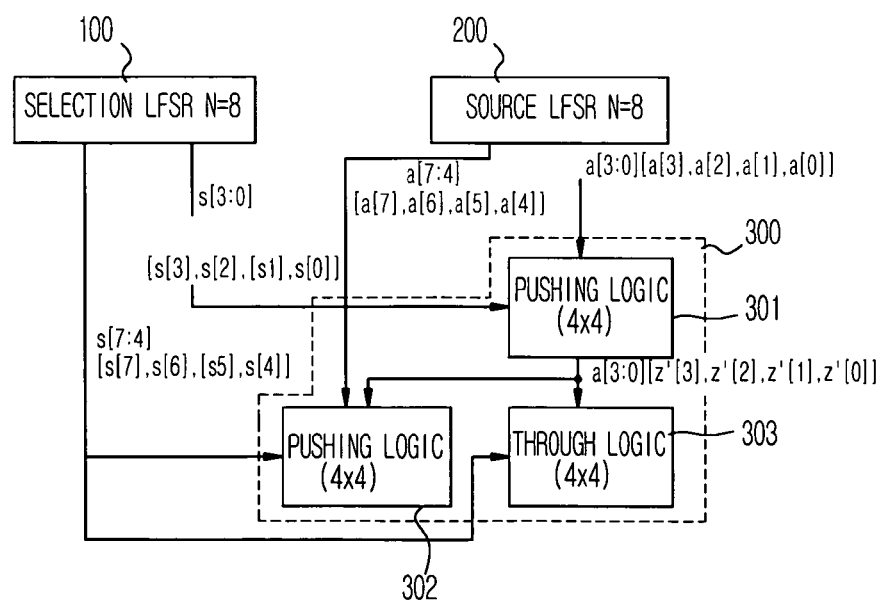
FIG. 5 is a truth table of a pushing logic shown in FIG. 4.
FIG. 6 is a block diagram showing a selection logic circuit shown in FIG. 2.
Figure 7:
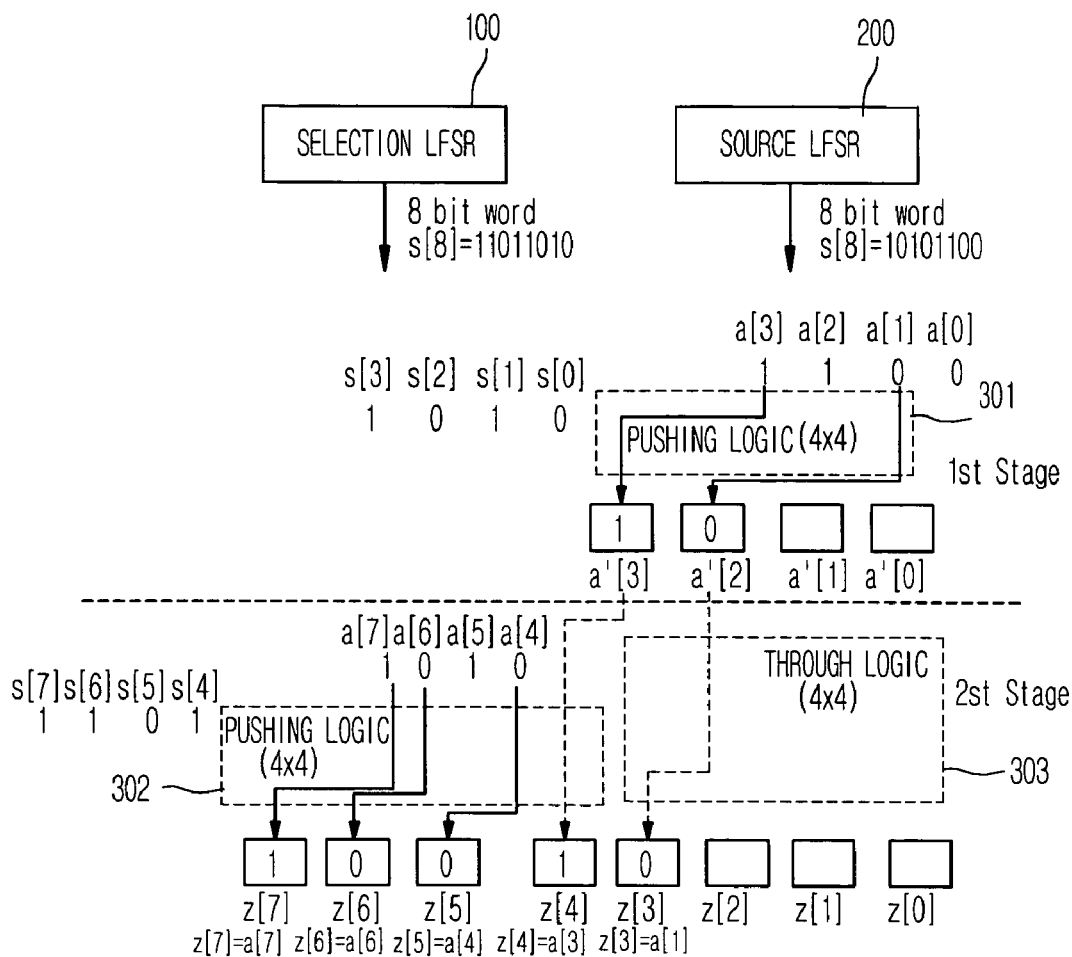
FIG. 7 is a view for explaining operations of a pushing logic and a through logic in a selection logic circuit shown in FIG. 2.
Figure 8:
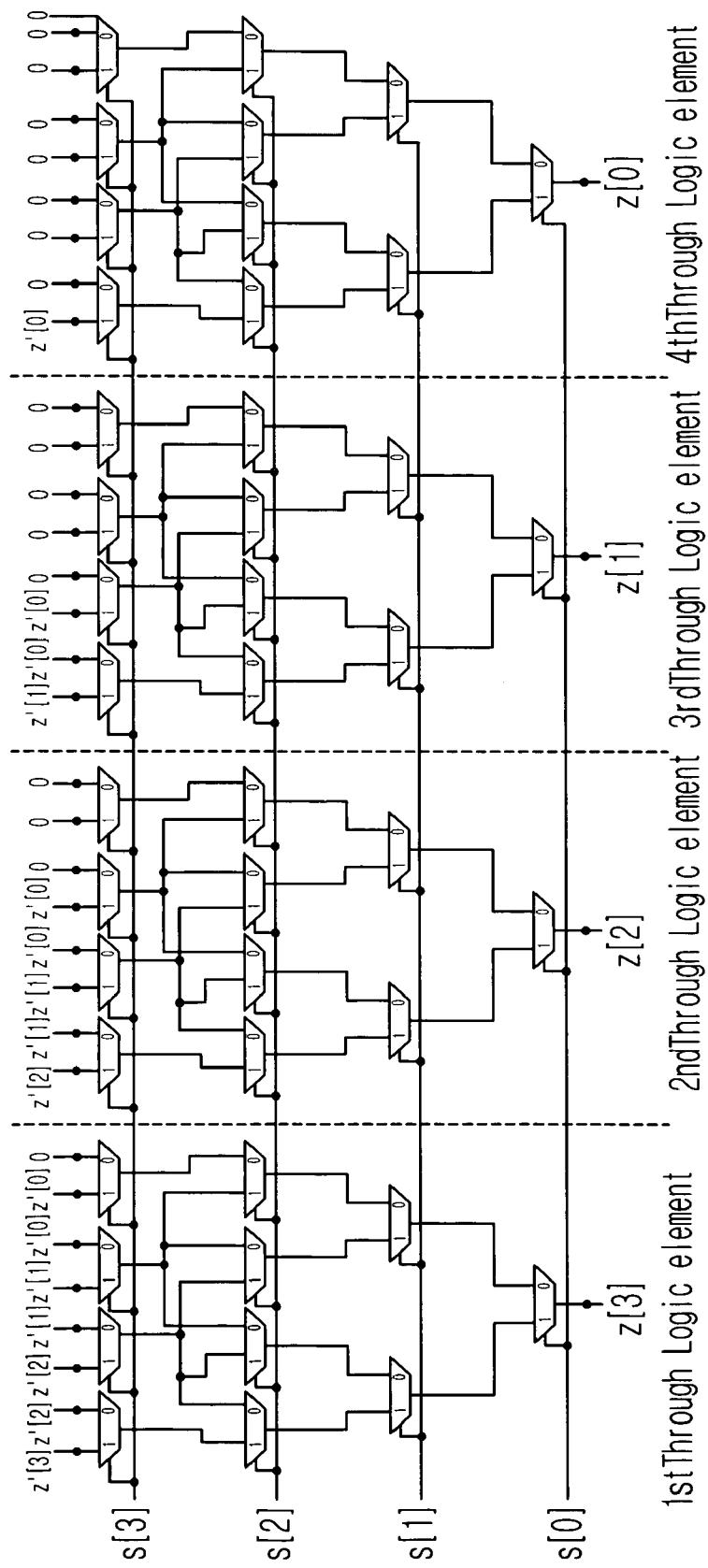
FIG. 8 is a detailed circuit diagram of a through logic shown in FIG. 6.

FIG. 6 is a block diagram showing a selection logic circuit shown in FIG. 2 and FIG. 7 is a view for explaining operations of a pushing logic and a through logic in a selection logic circuit shown in FIG. 2. FIG. 8 is a detailed circuit diagram of a through logic shown in FIG. 6.

As shown in FIGS. 6 and 7, the selection logic circuit 300 is configured with a first pushing logic 310, a second pushing logic 302 and a first through logic 303 when each of the selection bit of the selection LFSR 100 and the source bit of the source LFSR 200 is 8 bit.

The selection logic circuit 300 is configured with the first pushing logic 301 at a first stage and is configured with the second pushing logic 302 and the first through logic 303.

As shown in FIG. 8, the first through logic 303 is configured with a plurality of 2:1 multiplexers.

Figure 10:
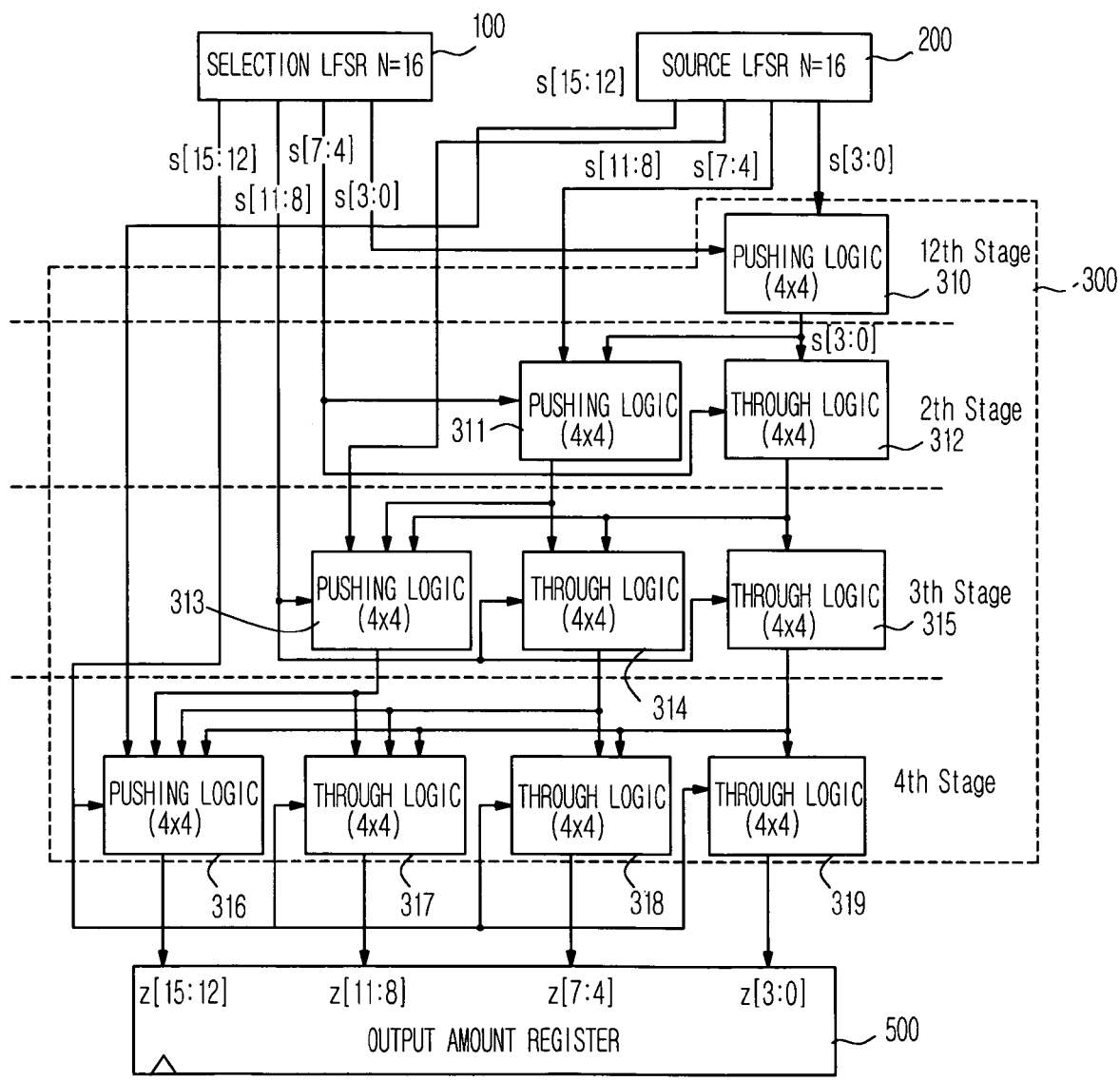
FIG. 10 is a block diagram showing a selection logic circuit shown in FIG. 2.

FIG. 10 is a block diagram showing a selection logic circuit shown in FIG. 2.

As shown in FIG. 10, the selection logic circuit 300 is configured with a first to a fourth pushing logics 310 to 316 and a first to a sixth through logics 312 to 319.

The selection logic circuit 300 is configured with the first pushing logic 310 at a first stage, and is configured with the second pushing logic 311 and the first through logic 312. Also, the selection logic circuit 300 is configured with the third pushing logic 313, the second through logic 314 and the third through logic 315 at a third stage and is configured with the fourth pushing logic 316, the fourth through logic 317, the fifth through logic 318 and the sixth through logic 319.

Figure 1:
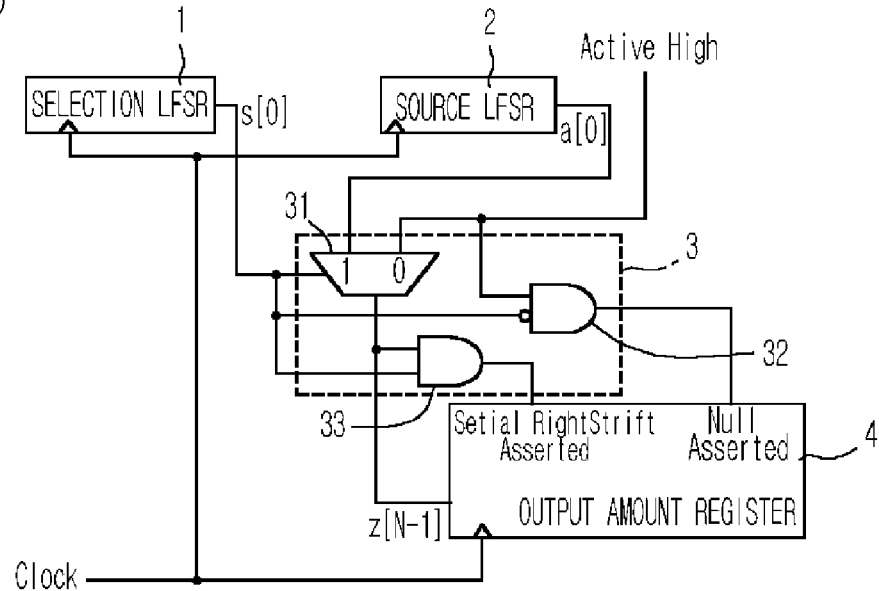
FIG. 1 is a block diagram illustrating a sequential processing shrinking key generator according to a prior art.

FIG. 1 is a block diagram showing a selection logic circuit shown in FIG. 2.

Figure 11:
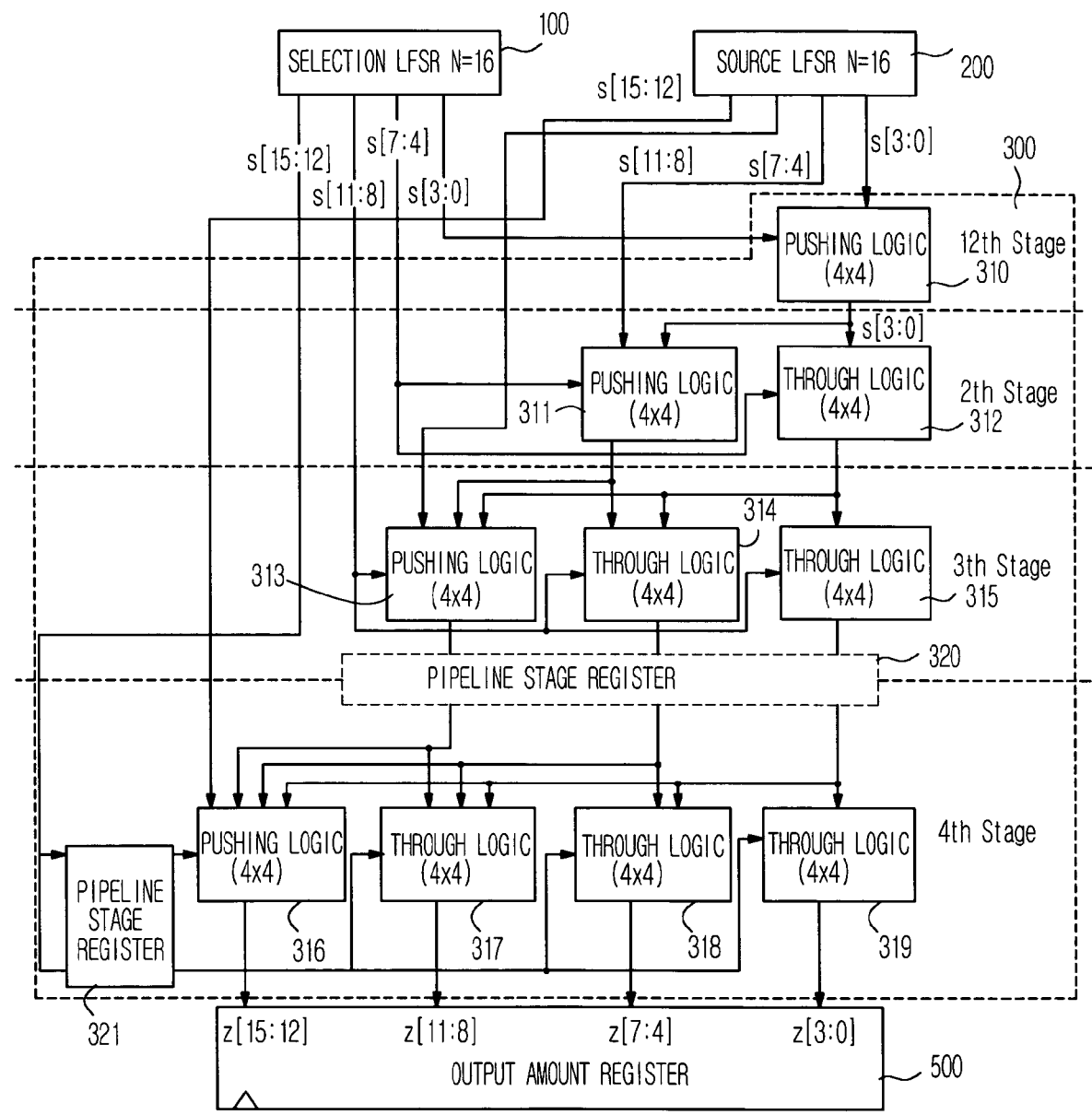
FIG. 11 is a block diagram showing a selection logic circuit shown in FIG. 2.

As shown in FIG. 11, the selection logic circuit 300 further includes a pipeline stage register 320 between the second stage and the third stage for eliminating a fan-in and fan-out problem.

Hereinafter, operations of a parallel processing shrinking key generator according to a preferred embodiment of the present invention will be explained with reference to FIGS. 2 to 11.

At first, the selection LFSR 100 shifts a selection bit according to an inputted clock signal (Clock) and the source LFSR 200 shifts a source bit according to the clock signal (Clock). The selection logic circuit 300 selects one of the source bit of the source LFSR 200 and a predetermined input bit according to the selection bit of the selection LFSR 100. The index counter 400 assigns an index where output bits of the selection logic circuit 300 are stored at a next clocking of the clock signal (Clock). The output amount register 500 shifts an output bit of the selection logic circuit 300 according to the assignment of the index counter 400.

The index counter 400 assigns an index of the output amount register 500 to be different as many as the number of bits outputted from the selection logic circuit 300. Therefore, irregular numbers of output bits are stored.

As shown in FIGS. 3 and 4, when each of the selection bit from the selection LFSR 100 and the source bit from the selection LFSR 200 is 4 bit, a plurality of 2:1 multiplexers of single pushing logic of the selection logic circuit 300 multiplexes the source bit of the source LFSR 200 and the predetermined input bit according to the selection bit of the selection LFSR 100.

As shown in FIG. 5, the truth table shows values of output bits (z[n], a[n]) according to a selection bit (s[n]). Z' [n] denotes an output bit outputted at previous stage. FIG. 3 shows a principle to store a value at z[4] by a 4-by-4 push logic under conditions that the number of bus bits is 4, s[4] =1001 and a[4]=1100.

The truth table of the FIG. 5 must be satisfied for all 16 cases as like as FIG. 3. A logic satisfying the truth table of FIG. 5 can be achieved by a combination of 2:1 multiplexers as like as FIG. 4. Also, the logic satisfying the through table of FIG. 5 can be implemented by a programmable logic array. However, the combination of 2:1 multiplexers are the most optimized logic.

Meanwhile, as shown in FIGS. 6 and 7, when each of the selection bit of the selection LFSR 100 and the source bit of the source LFSR 200 is 8 bit, that is, in case of 8 bit bus, the selection logic circuit 300 is configured with the first pushing logic 301 at a first stage and is configured with the second pushing logic 302 and the first through logic 303.

At the second stage, if all of MSB to pushing logic 302 is stored, a 4-by-4 through logic 303 is required for storing next bits. FIG. 9 shows a truth table of a 4-by-4 through logic and a logic satisfying the truth table of FIG. 9 can be configured with a combination of four through logic elements each of which processes 1 bit as shown in FIG. 8.

Meanwhile, as shown in FIG. 10, when each of the selection bit of the selection LFSR 100 and the source bit of the source LFSR 200 is 16 bit, that is, in case of 16 bit bus, the selection logic circuit 300 is configured with the first pushing logic 310 at a first stage, and is configured with the second pushing logic 311 and the first through logic 312. Also, the selection logic circuit 300 is configured with the third pushing logic 313, the second through logic 314 and the third through logic 315 at a third stage and is configured with the fourth pushing logic 316, the fourth through logic 317, the fifth through logic 318 and the sixth through logic 319.

As shown in FIG. 11, the fan-in and fan-out problem is eliminated by the pipeline stage register 320 of the selection logic circuit 300 formed between the second stage and the third stage. A maximum value cannot be exceeded between the third stage and the fourth stage because of each FPGA device difference of the fan-in & fan-out between 2:1 multiplexers. Therefore, the pipeline stage register is arranged between them for eliminating the fan-in & fan-out problem. Also, the pipeline stage register 320 eliminates a timing delay or a clock skew which instabilities. Therefore, operations of logic are smoothly progressed and a Place & Route (P & R) problem, caused by the fan-in & fan-out, is prevented.

According to the parallel processing shrinking key generator as described above, a speed of generating a key is fastened as much as 16 times compared to the conventional sequential shrinking key generator although the parallel processing logics occupy more logic cells as many as 40 times compared to the conventional sequential logic. Such an improvement of the present invention can be obtained from a functional % timing simulation in a FPGA6000T using the synthesis tool according to the present embodiment. The simulation is performed in a Cyclone FPGA 6000T. In the simulation, the selection logic circuit is not synthesized as Behavioral HDL codes and there are many errors found in a functional simulation.

TABLE 1

| | Combinational design | Sequential design |
|---|---|---|
| N (Degree of LFSR) | 16 | 16 |
| VHDL code side (Lines) | 900 | 50 |
| Design size (Logic Cell) | 5,700 | 120 |
| Clock (Mhz) | 48 | 48 |
| Date rate in Cyclone 6000 T (Mbps) | 192-256 | 16-24 |

As mentioned above, a shrinking key generator was implemented as the conventional sequential logic which provides high security but low speed of key generation because of limitation of non-boolean algebraic characteristic of the shrinking key generator. However, according to the present invention, the shrinking key generator is implemented as a combinational circuit capable of parallel processing by using the pushing logic having an extendibility of processing bit unit (4, 8, 16 bits, . . . ) according to the number bits of data processing and the through logic. Therefore, a high-speed shrinking key generator can be implemented in various encoders and decoders by using the provided designing technology of the shrinking key generator according to the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A parallel processing shrinking key generator, comprising:
    a selection linear feedback shift register (LFSR) coupled to receive a clock signal for shifting a selection bit according to the clock signal;
    a source LFSR coupled to receive the clock signal for shifting a source bit according to the clock signal;
    a selection logic circuit coupled to outputs of the selection LFSR and the source LFSR for selecting, according to the selection bit outputted from the selection LFSR, one of (a) the source bit outputted from the source LFSR and (b) a predetermined input bit;
    an index counter coupled to receive the clock signal and to the output of the selection LFSR for assigning an index indicating where output bits of the selection logic circuit are to be stored to an output amount register at a next clocking of said clock signal; and
    the output amount register coupled to receive the clock signal and to the output of the selection logic circuit for shifting an output bit of the selection logic circuit according to the index;
    wherein the selection logic circuit consists of multiplexers;
    wherein the selection logic circuit includes four identical pushing logics and six identical through logics when each of the selection LFSR and the source LFSR is a 16 bit LFSR;
    wherein the selection logic circuit further comprises
        a first pushing logic at a first stage,
        a second pushing logic and a first through logic at a second stage, wherein the second pushing logic and the first through logic are coupled to an output of the first pushing logic;
        a third pushing logic, a second through logic and a third through logic at a third stage, wherein the third pushing logic, the second through logic and the third through logic are all coupled to an output of the first through logic, and only the third pushing logic and the second through logic are coupled to an output of the second pushing logic; and a fourth pushing logic, a fourth through logic, a fifth through logic and a sixth through logic at a fourth stage, wherein the fourth pushing logic, the fourth through logic, the fifth through logic and the sixth through logic are all coupled to an output of the third through logic, only the fourth pushing logic, the fourth through logic, and the fifth through logic are coupled to an output of the second through logic, and only the fourth pushing logic and the fourth through logic are coupled to an output of the third pushing logic;

wherein outputs of the fourth pushing logic, the fourth through logic, the fifth through logic and the sixth through logic are coupled to the output amount register; and wherein the selection LFSR outputs N bits from s[0], s[1], . . . to s[N−1], where N is great than 1;

the source LFSR outputs N bits from a[0], a[1], . . . to a[N−1] which correspond to s[0], s[1], . . . to s[N−1], respectively; and for each bit among s[0], s[1], . . . to s[N−1] which is 1, the selection logic circuit outputs the corresponding bit among a[0], a[1], . . . to a[N−1].

2. The parallel processing shrinking key generator of claim 1, wherein the selection logic circuit comprises a single pushing logic at a first stage when each the selection LFSR and the source LFSR is a 4 bit LFSR.

3. The parallel processing shrinking key generator of claim 2, wherein the multiplexers define the pushing logic of the selection logic circuit and are 2:1 multiplexers for multiplexing the source bit of the source LFSR and the predetermined input bit according to the selection bit of the selection LFSR.

4. The parallel processing shrinking key generator of claim 1, wherein the selection logic circuit comprises two pushing logics and a single through logic when each of the selection LFSR and the source LFSR is a 8 bit LFSR.

5. The parallel processing shrinking key generator of claim 4, wherein the multiplexers define each of the pushing logics as well as the through logic of the selection logic circuit and are 2:1 multiplexers for multiplexing the source bit of the source LFSR and the predetermined input bit according to the selection bit of the selection LFSR.

6. The parallel processing shrinking key generator of claim 4, wherein the selection logic circuit comprises a first pushing logic at a first stage; and a second pushing logic and a first through logic at a second stage;

wherein the second pushing logic is identical to the first pushing logic; and the second pushing logic and the first through logic are coupled to an output of the first pushing logic.

7. A parallel processing shrinking key generator, comprising:

a selection linear feedback shift register (LFSR) coupled to receive a clock signal for shifting a selection bit according to the clock signal;

a source LFSR coupled to receive the clock signal for shifting a source bit according to the clock signal;

a selection logic circuit coupled to outputs of the selection LFSR and the source LFSR for selecting, according to the selection bit outputted from the selection LFSR, one of (a) the source bit outputted from the source LFSR and (b) a predetermined input bit;

an index counter coupled to receive the clock signal and to the output of the selection LFSR for assigning an index indicating where output bits of the selection logic circuit are to be stored to an output amount register at a next clocking of said clock signal; and the output amount register coupled to receive the clock signal and to the output of the selection logic circuit for shifting an output bit of the selection logic circuit according to the index;

wherein the selection logic circuit includes four identical pushing logics and six identical through logics when each of the selection LFSR and the source LFSR is a 16 bit LFSR;

wherein the selection logic circuit comprises a first pushing logic at a first stage, a second pushing logic and a first through logic at a second stage, wherein the second pushing logic and the first through logic are coupled to an output of the first pushing logic;

a third pushing logic, a second through logic and a third through logic at a third stage, wherein the third pushing logic, the second through logic and the third through logic are all coupled to an output of the first through logic, and only the third pushing logic and the second through logic are coupled to an output of the second pushing logic; and a fourth pushing logic, a fourth through logic, a fifth through logic and a sixth through logic at a fourth stage, wherein the fourth pushing logic, the fourth through logic, the fifth through logic and the sixth through logic are all coupled to an output of the third through logic, only the fourth pushing logic, the fourth through logic, and the fifth through logic are coupled to an output of the second through logic, and only the fourth pushing logic and the fourth through logic are coupled to an output of the third pushing logic;

wherein outputs of the fourth pushing logic, the fourth through logic, the fifth through logic and the sixth through logic are coupled to the output amount register;

wherein the selection logic circuit further includes a pipeline stage register between the fourth stage and the third stage for eliminating a fan-in and fan-out problem; and wherein the selection LFSR outputs N bits from s[0], s[1], . . . to s[N−1], where N is great than 1;

the source LFSR outputs N bits from a[0], a[1], . . . to a[N−1] which correspond to s[0], s[1], . . . to s[N−1], respectively; and for each bit among s[0], s[1], . . . to s[N−1] which is 1, the selection logic circuit outputs the corresponding bit among a[0], a[1], . . . to a[N−1].

8. The parallel processing shrinking key generator of claim 1, wherein all of said multiplexers are 2:1 multiplexers.

9. The parallel processing shrinking key generator of claim 1, wherein the multiplexers of the selection logic circuit are arranged in N rows corresponding to s[0], s[1], . . . to s[N−1], respectively;

the multiplexers in each row are commonly connected to receive one bit among s[0], s[1], ... to s[N−1].

10. The parallel processing shrinking key generator of claim 9, wherein
only one multiplexer in each row is connected to receive the corresponding bit among a[0], a[1], ... to a[N−1].

11. The parallel processing shrinking key generator of claim 1, wherein
a[0], a[1], ... to a[N−1] are divided into M first groups of consecutive bits, where M is greater than 1;
s[0], s[1], ... to s[N−1] are divided into M second groups of consecutive bits corresponding to the first groups of consecutive bits; and
the multiplexers of the selection logic circuit define M identical pushing logics each of which is coupled to receive one of the first groups of consecutive bits and the corresponding one of the second groups of consecutive bits.

12. The parallel processing shrinking key generator of claim 11, wherein
the multiplexers of the selection logic circuit further define a plurality of identical through logics;
said pushing and through logics are arranged in M stages comprising first to $M^{th}$ stages;
each stage includes one pushing logic; and
each $i^{th}$ stage includes (i−1) through logic(s), where i=1 to M.

13. The parallel processing shrinking key generator of claim 12, wherein
the pushing and through logics in each of the second to $M^{th}$ stages are commonly coupled to receive the corresponding second group of consecutive bits from the selection LFSR.

14. The parallel processing shrinking key generator of claim 13, wherein
an output of the pushing logic in each $j^{th}$ stage, where j=1 to (M−1), is inputted into the pushing logic and only one through logic of the $(j+1)^{th}$ stage.

15. The parallel processing shrinking key generator of claim 14, wherein
an output of each through logic in each $k^{th}$ stage, where k=2 to M, is inputted into the pushing logic and more than one through logic of the $(k+1)^{th}$ stage.

16. The parallel processing shrinking key generator of claim 15, wherein
the output of one through logic in each $k^{th}$ stage is inputted into the pushing logic and all through logics of the $(k+1)^{th}$ stage.

* * * * *